(12) United States Patent
Pugh et al.

(10) Patent No.: US 11,970,969 B2
(45) Date of Patent: Apr. 30, 2024

(54) COMPRESSOR BYPASS BLEED SYSTEM FOR A DUCTED FAN ENGINE

(71) Applicant: General Electric Company, Schenectady, NY (US)

(72) Inventors: Thomas L. Pugh, Morrow, OH (US); Mark E. Linz, Cincinnati, OH (US); Jarrod Paul Sands, West Chester, OH (US); John J. Rahaim, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/809,633

(22) Filed: Jun. 29, 2022

(65) Prior Publication Data
US 2024/0003292 A1    Jan. 4, 2024

(51) Int. Cl.
*F02C 6/08*    (2006.01)
*F02C 3/13*    (2006.01)
*F02C 7/30*    (2006.01)
*F02K 3/06*    (2006.01)

(52) U.S. Cl.
CPC ............ *F02C 6/08* (2013.01); *F02C 3/13* (2013.01); *F02C 7/30* (2013.01); *F02K 3/06* (2013.01)

(58) Field of Classification Search
CPC ..................................... F02C 3/13; F02C 6/08
See application file for complete search history.

(56) References Cited

U.S. PATENT DOCUMENTS

| 4,004,056 | A |   | 1/1977  | Carroll |
| 4,142,413 | A | * | 3/1979  | Bellinga ............... G01F 15/00 73/198 |
| 4,537,277 | A | * | 8/1985  | Bryce ..................... F02K 1/34 415/119 |
| 4,979,587 | A | * | 12/1990 | Hirt ..................... F04D 29/522 181/269 |
| 5,261,228 | A | * | 11/1993 | Shuba .................. F01D 17/105 60/226.3 |
| 5,491,310 | A | * | 2/1996  | Jen ....................... G10K 11/16 181/292 |
| 5,859,393 | A | * | 1/1999  | Cummins, Jr. ......... F01N 1/04 181/275 |

(Continued)

FOREIGN PATENT DOCUMENTS

| EP | 1434006 A2 | 6/2004 |
| EP | 3077727 B1 | 10/2019 |
| WO | 8806257 A1 | 8/1988 |

*Primary Examiner* — William H Rodriguez
(74) *Attorney, Agent, or Firm* — Venable LLP; Kurt W. R. Bessel; Michele V. Frank (57) ABSTRACT

An exhaust device for a compressor bypass bleed system of a ducted fan engine includes a housing having an inlet end and an outlet end and defining a centerline axis from the inlet end to the outlet end, an inlet flow conditioner arranged at the inlet end, the inlet flow conditioner including a plurality of inlet openings for conducting a flow of compressed air therethrough into the housing, and an exit screen arranged at the outlet end of the housing. The exit screen includes a plurality of exit openings therethrough arranged at an acute angle with respect to the centerline axis so as to provide a flow of compressed air therethrough into a bypass flow passage at least partially in a same direction as a bypass airflow through the bypass flow passage.

16 Claims, 7 Drawing Sheets

(56) References Cited

U.S. PATENT DOCUMENTS

| | | | | |
|---|---|---|---|---|
| 6,565,313 B2* | 5/2003 | Nikkanen | ............... | F01D 9/065 415/208.1 |
| 6,588,195 B2* | 7/2003 | Negulescu | ............. | F02K 3/075 60/785 |
| 6,981,842 B2* | 1/2006 | D'Angelo | ............ | F01D 17/105 415/28 |
| 7,387,489 B2* | 6/2008 | Appleby | ............... | F01D 17/105 415/121.2 |
| 7,797,945 B2* | 9/2010 | Appleby | ................... | F02C 9/18 415/144 |
| 7,921,652 B2* | 4/2011 | Kirby | ........................ | F02C 6/08 60/785 |
| 7,946,104 B2* | 5/2011 | Frank | ........................ | F02K 1/72 60/785 |
| 8,128,347 B2* | 3/2012 | Sokhey | ............. | F04D 27/0215 415/144 |
| 8,430,202 B1* | 4/2013 | Mason | ...................... | F02C 6/08 60/785 |
| 8,550,208 B1* | 10/2013 | Potokar | .................... | F02C 6/08 60/785 |
| 8,578,700 B2 | 11/2013 | Khakhar | | |
| 8,925,330 B2 | 1/2015 | Britchford et al. | | |
| 9,410,702 B2 | 8/2016 | Dudebout et al. | | |
| 10,113,484 B2* | 10/2018 | Glessner | ................... | F02C 9/18 |
| 10,386,068 B2 | 8/2019 | Kostka, Jr. et al. | | |
| 2001/0042368 A1* | 11/2001 | Negulescu | ............. | F02K 3/075 60/785 |
| 2003/0068223 A1* | 4/2003 | Nikkanen | ............... | F01D 9/065 415/144 |
| 2005/0067218 A1* | 3/2005 | Bristow | ............ | F01D 17/105 181/254 |
| 2008/0053105 A1* | 3/2008 | Appleby | ................ | F02K 3/075 60/785 |
| 2009/0126194 A1* | 5/2009 | Appleby | ............... | F01D 17/105 29/896.6 |
| 2009/0188257 A1* | 7/2009 | Kirby | .................. | F04D 27/0215 60/785 |
| 2010/0236256 A1* | 9/2010 | Hussain | ..................... | F02C 6/08 60/785 |
| 2013/0277142 A1 | 10/2013 | Potokar | | |
| 2017/0114657 A1* | 4/2017 | Hussain | ..................... | F02C 9/18 |
| 2017/0175640 A1* | 6/2017 | Glessner | ................... | F02C 6/08 |

* cited by examiner

COMPRESSOR BYPASS BLEED SYSTEM FOR A DUCTED FAN ENGINE

TECHNICAL FIELD

The present disclosure relates to a compressor bypass bleed system for a ducted fan engine.

BACKGROUND

Some ducted fan engines include a core engine having a compressor section that compresses inlet air to be used for combustion, as well as to be used for various other purposes, such as cooling of the engine and environmental control. A bleed system may be connected with the compressor section to bleed compressed air from the compressor at various operating conditions of the engine to provide more efficient operations of the engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. The following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Some ducted fan engines include a core engine having a compressor section that compresses inlet air to be used for combustion, as well as to be used for various other purposes, such as cooling of the engine and environmental control. A bleed system may be connected with the compressor section to bleed compressed air from the compressor at various operating conditions of the engine to provide more efficient operations of the engine. The bleed system may include a duct that routes the compressed air from the compressor to an exhaust device, from which the compressed air is injected into a bypass flow passage between the core engine and a nacelle surrounding the core engine. The compressed air may be at a high pressure and at a high temperature, and if the high temperature compressed air is injected into the bypass flow passage, the high temperature compressed air may damage an inner surface of the nacelle, which is generally made of a composite material. To reduce the possibility of damage to the nacelle, some engines may include a heat shield on the inner surface of the nacelle, which increases the weight of the nacelle.

The present disclosure aims to address the foregoing by providing an exhaust device that provides for better directional flow of the compressed air into the bypass flow passage in order to reduce or to prevent damaging of the inner surface of the nacelle. According to the present disclosure, a compressor bypass bleed system includes an exhaust device that has an exhaust screen that includes a plurality of exit openings therethrough arranged at an acute angle so as to provide a flow of compressed air therethrough into the bypass flow passage at least partially in a same direction as a bypass airflow through the bypass flow passage. The exit openings may additionally be arranged in a particular pattern that aids in the directional flow of the compressed air. Further, the exit screen may include vanes that assist in guiding the compressed air in the directional flow. As a result, the compressed air can be better directed into the bypass airflow and away from the inner surface of the nacelle, thereby reducing the possibility of damaging the nacelle, and eliminating the need for a heat shield to be added to the nacelle.

Figure 1:
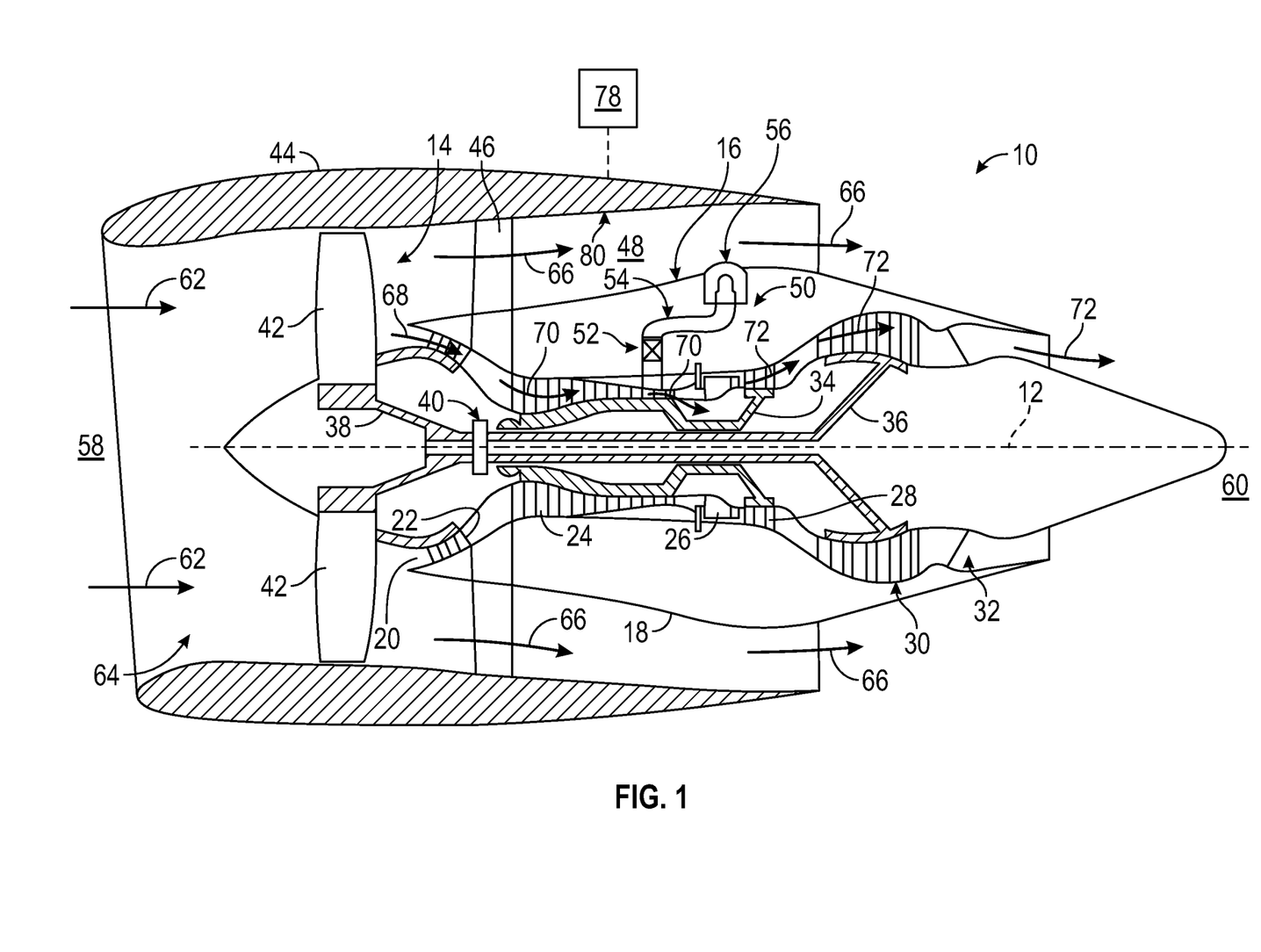
FIG. 1 is a schematic partial cross-sectional side view of an exemplary high bypass turbofan jet engine, according to an aspect of the present disclosure.

Referring now to the drawings, FIG. 1 is a schematic partial cross-sectional side view of an exemplary high bypass turbofan jet engine 10, herein referred to as "engine 10," as may incorporate various embodiments of the present disclosure. Although further described below with reference to a turbofan engine, the present disclosure is also applicable to turbomachinery in general, including marine-based turbine engines, industrial turbine engines, and auxiliary power units. As shown in FIG. 1, the engine 10 has an axial centerline axis 12 that extends therethrough from an upstream end 58 of the engine 10 to a downstream end 60 of the engine 10 for reference purposes. In general, the engine 10 may include a fan assembly 14 and a core engine 16 disposed downstream from the fan assembly 14.

The core engine 16 may more generally comprise a gas turbine, and the core engine 16 may generally include an outer casing 18 that defines an annular inlet 20. The outer casing 18 at least partially surrounds or encases, or at least partially forms, in serial flow relationship, the core engine 16 having a compressor section (22/24) having a low pressure (LP) compressor 22 and a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration.

As shown in FIG. 1, the fan assembly 14 includes a plurality of fan blades 42 that are coupled to, and that extend radially outwardly from, the fan shaft 38. An annular fan casing or a nacelle 44 circumferentially surrounds the fan assembly 14 and/or at least a portion of the core engine 16. The nacelle 44 may be supported relative to the core engine 16 by a plurality of circumferentially spaced outlet guide vanes or struts 46. Moreover, at least a portion of an inner side 80 of the nacelle 44 may extend over an outer portion of the core engine 16 so as to define a bypass airflow passage 48 therebetween.

The core engine 16 may further include a compressor bypass bleed system 50 that may include a compressor transient bleed valve 52, a bleed air duct 54, and an exhaust device 56. In general, during various operating conditions of the engine 10, the compressor transient bleed valve 52 may be operated to allow compressed air from the HP compressor 24 to flow therethrough as a compressor bleed airflow, and to flow through the bleed air duct 54 to the exhaust device 56. As will be described in more detail below, the exhaust device 56 may function as a muffling device to condition the compressor bleed airflow before exhausting the compressor bleed airflow into the bypass airflow passage 48 so as to minimize an acoustic effect of the compressor bleed airflow with the bypass airflow 66.

During operation of the engine 10, which may be controlled by an engine controller 78, as shown in FIG. 1, a volume of engine inlet air, as indicated schematically by arrows 62, enters the engine 10 from the upstream end 58 through an associated inlet duct 64 of the nacelle 44. As the engine inlet air 62 passes across the fan blades 42, a portion of the engine inlet air 62 is directed or routed into the bypass airflow passage 48 as a bypass airflow 66, while another portion of the engine inlet air 62 is directed or routed into the annular inlet 20 and into the LP compressor 22 as a compressor inlet air 68. The compressor inlet air 68 is progressively compressed as it flows through the LP compressor 22 and the HP compressor 24 to form compressed air 70. As will be described below, at least a portion of the compressed air 70 may be routed through the compressor bypass bleed system 50. The compressed air 70 flows into the combustor 26, where it is mixed with fuel and ignited to generate combustion gases 72. The combustion gases 72 flow into the HP turbine 28, thus causing the HP rotor shaft 34 to rotate, thereby supporting operation of the HP compressor 24. The combustion gases 72 are then routed through the LP turbine 30, thus causing the LP rotor shaft 36 to rotate, thereby supporting operation of the LP compressor 22 and/or rotation of the fan shaft 38. The combustion gases 72 are then exhausted through the jet exhaust nozzle section 32 of the core engine 16 to provide propulsion at the downstream end 60 of the engine 10.

Figure 2:
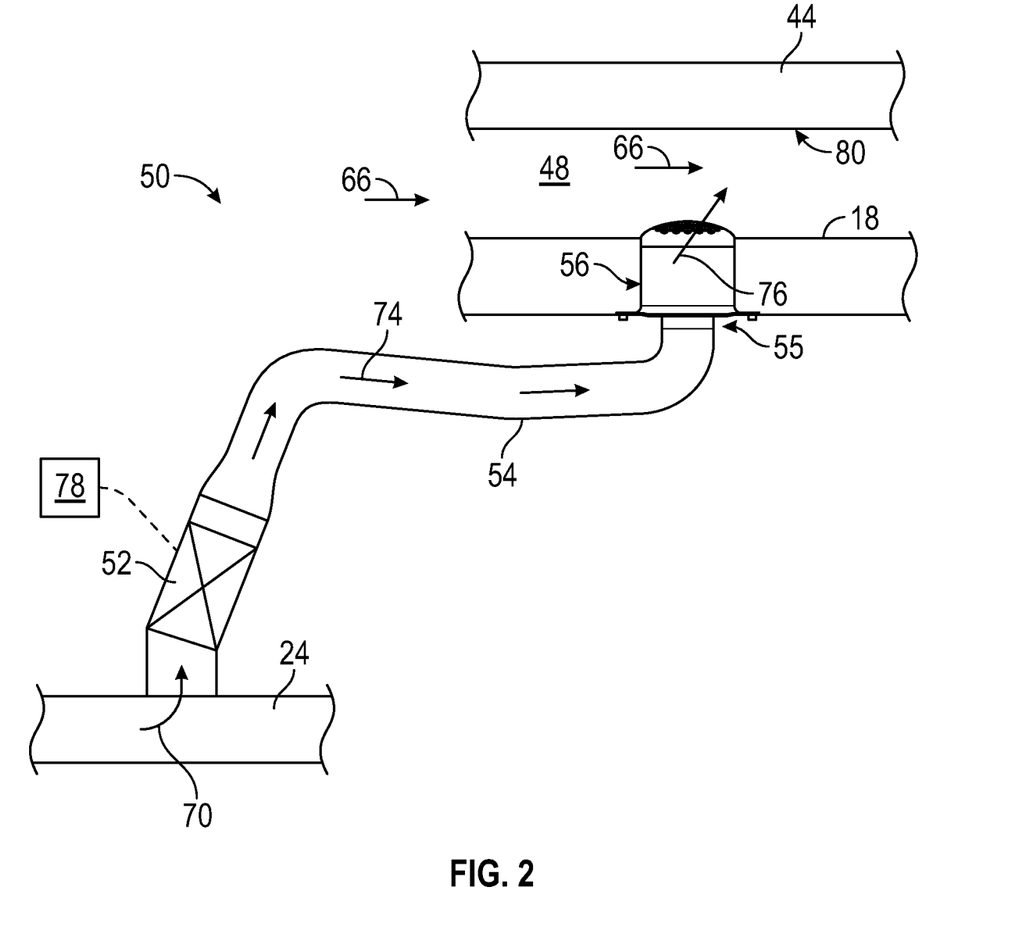
FIG. 2 is an enlarged partial view of an exemplary compressor bypass bleed system, according to an aspect of the present disclosure.

FIG. 2 is an enlarged view depicting a compressor bypass bleed system according to an aspect of the present disclosure. As shown in FIG. 2, the compressor bypass bleed system 50 includes the transient bleed valve 52, which may be controlled by the engine controller 78 (FIG. 1). In FIG. 2, the transient bleed valve 52 is depicted as a general representation, but the transient bleed valve 52 may constitute a pneumatic valve, an electronic valve, a hydraulic valve, or any other type of valve that controls a flow of air, and, more particularly, controls the flow of high pressure and high temperature air. Here, the compressed air 70 that enters the transient bleed valve 52 and may be pressurized by the HP compressor 24 to a pressure of about 1375 kPa and may have a temperature of about 538 degrees Celsius. Thus, the transient bleed valve 52 is a valve capable of operating with an airflow at such a high pressure and a high temperature. When the transient bleed valve 52 is operated, a flow of the compressed air 70 enters the transient bleed valve 52 and compressed air 74 exits the transient bleed valve 52 and flows into the bleed air duct 54, which is coupled to the transient bleed valve 52. Due to the high pressure and the high temperature of the compressed air 74 flowing through the bleed air duct 54, the bleed air duct 54 is formed of a high temperature and a high pressure resistant material, such as a metal or a high temperature composite material such as a CMC material, in order to withstand the high pressure and temperature of the compressed air 74. The exhaust device 56 is coupled to the bleed air duct 54 at a downstream end 55 of the bleed air duct 54. As will be described in more detail below, the compressed air 74 flows from the bleed air duct 54 into the exhaust device 56, where the compressed air 74 is conditioned (e.g., provided with a pressure drop and/or a temperature drop) prior to being exhausted into the bypass airflow passage 48 as compressed air 76. As will be described below, the exhaust device 56 is arranged to provide a directional flow of the compressed air 76 into the bypass airflow passage 48 so as to avoid having the compressed air 76, which may still be at a high temperature and pressure even though it may be conditioned by the exhaust device 56, from scrubbing an inner side 80 of the nacelle 44.

Figure 3:
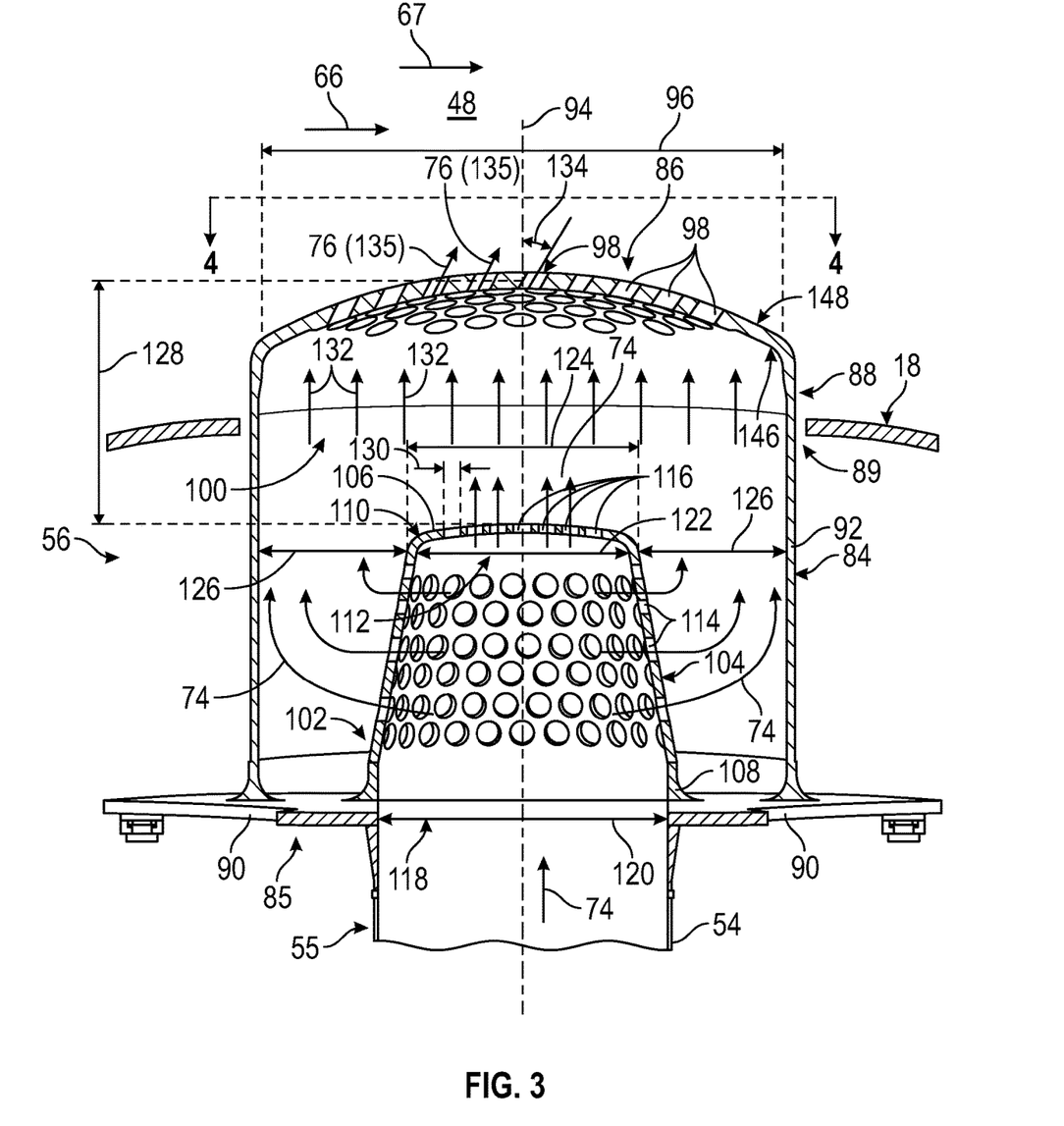
FIG. 3 is a partial cross-sectional view of an exemplary exhaust device, according to an aspect of the present disclosure.

FIG. 3 is a partial cross-sectional view of an example exhaust device 56, according to an aspect of the present disclosure. The exhaust device 56 may comprise a housing 84 that extends through an opening 89 in the outer casing 18 and includes an inlet end 85 and an outlet end 88, which may include an exhaust screen 86 (which may be generally circular) at the outlet end 88 of the housing 84, an upstream end wall 90 (which may be generally annular), and a sidewall 92 (which may be generally circular). Housing 84 may be generally in the form of a hollow circular cylinder arranged about a centerline axis 94 with a diameter 96. The exhaust screen 86 may include a plurality of exit openings 98 (e.g., holes) through which compressed air 76 may be discharged from an interior 100 of housing 84 (the compressed air 76 may also be referred to as a directional (exit) airflow 135). Each of the exit openings 98 depicted in FIG. 3 extends through the exhaust screen 86 from an inner surface 146 of the exhaust screen 86 to an outer surface 148 of the exhaust screen 86. In addition, each of the exit openings 98 is arranged at an exit angle 134 with respect to the centerline axis 94. In one aspect, the exit angle 134 may be forty degrees in a downstream direction (i.e., in a same direction as a flow direction 67 of the bypass airflow 66 through the bypass airflow passage 48). In another aspect, the exit angle 134 may be in a range from thirty-five degrees to forty-five degrees in the downstream direction. The exit angle 134 may be within other ranges as well and the exit angle 134 is not limited to the foregoing range, as long as the exit angle 134 is arranged in the downstream direction with respect to the flow direction 67 of the bypass airflow 66. Thus, the directional (exit) airflow 135 is provided through each of the exit openings 98 in the downstream direction.

An inner flow conditioner 102 may be disposed within the housing 84. The inner flow conditioner 102 may be generally in the form of a hollow, conical frustum arranged coaxially with housing 84 about the centerline axis 94. The inner flow conditioner 102 may include an inwardly tapering sidewall 104 and a downstream end wall 106, which may be generally circular. The sidewall 104 may be shaped generally as a truncated cone (i.e., may be frustum conical shaped). The downstream end wall 106 may be generally orthogonal to the centerline axis 94. The inner flow conditioner 102 may taper inwardly from an upstream base 108 (which may be substantially circumscribed by upstream end wall 90) at the inlet end 85 of the housing 84 to a downstream base 110 (which may be proximate to the downstream end wall 106). The sidewall 104 and the downstream end wall 106 may at least partially define an interior 112 of the inner flow conditioner 102. The sidewall 104 may include a plurality of generally laterally oriented openings (or holes) 114 and/or downstream end wall 106 may include a plurality of generally axially oriented openings (or holes) 116 through which pressurized air may be discharged into the interior 112 of the housing 84. The inner flow conditioner 102 may be arranged to receive the compressed air 74 from the bleed air duct 54 through an inlet 118 (which may be proximate to the upstream base 108). The inner flow conditioner 102 may have an upstream base diameter 120 proximate to the inlet 118 and a downstream base diameter 122 proximate the downstream end wall 106. The upstream base diameter 120 may be greater than the downstream base diameter 122. The inner flow conditioner 102 may be attached inside of the housing 84 such that the inlet 118 is disposed within the upstream end wall 90 of the housing 84.

The downstream base 110 may at least partially define a downstream end wall area 124, which may be the generally axially downstream facing area of the downstream end wall 106. The downstream base 110 and the housing 84 may at least partially define a downstream end annular area 126, which may be the generally axially downstream facing area between the downstream end wall 106 and the sidewall 92 of the housing 84. In one exemplary aspect, a ratio of the downstream end wall area 124 to the downstream end annular area 126 may be about 0.12 to about 0.97. In another exemplary aspect, the ratio of the downstream end wall area 124 to the downstream end annular area 126 may be about 0.16 to about 0.28. In yet another exemplary aspect, a ratio of downstream end wall area 124 to downstream end annular area 126 may be about 0.17 to about 0.20.

In operation, the inner flow conditioner 102 and the exhaust screen 86 may be configured to conduct the compressed air 74 inward through inlet 118 into the interior 112 of the inner flow conditioner 102, through the laterally oriented openings 114 and/or through the axially oriented openings 116 of the inner flow conditioner 102 into the interior 100 of the housing 84, and then outward through the exit openings 98 of exhaust screen 86. The interior 100 of the housing 84 may be substantially devoid of flow obstructions between the laterally oriented openings 114 and the axially oriented openings 116 of the inner flow conditioner 102 and the exit openings 98 of exhaust screen 86.

Each of the laterally oriented openings 114, the axially oriented openings 116, and the exit openings 98 has individual sizes (e.g., diameters and/or slot length/width) and areas that provide an effective area for fluid flow. An effective area of an opening for fluid flow may be determined by known methods, and may depend on the size and the shape of the opening. In some aspects of the present disclosure, a ratio of the downstream end annular area 126 to the downstream end wall area 124 may be proportional, by a factor of about 0.8 to about 1.9, to a ratio of the effective area of the laterally oriented openings 114 of the sidewall 104 of the inner flow conditioner 102 to the effective flow area of the axially oriented openings 116 of the downstream end wall 106 of the inner flow conditioner 102. This relationship may be expressed as:

$$\frac{\text{downstream end annular area 126}}{\text{downstream end wall area 124}} = F * \frac{\text{effective flow area of laterally oriented openings 114}}{\text{effective flow area of axially oriented openings 116}}$$

where F may be about 0.8 to about 1.9. In another aspect, F may be about 0.88 to about 1.58, and in another aspect, F may be about 0.97 to about 1.26.

In one aspect according to the present disclosure, a ratio of an effective flow area of the laterally oriented openings 114 and the axially oriented openings 116 of the inner flow conditioner 102 to an effective flow area of the inlet 118 may be about 0.7 to about 1.2. In another aspect according to the present disclosure, a ratio of an effective flow area of the laterally oriented openings 114 and the axially oriented openings 116 of the inner flow conditioner 102 to an effective flow area of the inlet 118 may be about 0.76 to about 0.91.

In yet another aspect according to the present disclosure, the inner flow conditioner 102 may be disposed within the housing 84 such that airflow through the axially oriented openings 116 of the downstream end wall 106 substantially dissipates before the airflow reaches the exhaust screen 86 of the housing 84. For example, the downstream end wall 106 may be spaced from the exhaust screen 86 by a dissipation distance 128, and one or more of the axially oriented openings 116 through the downstream end wall 106 may have an opening diameter 130. In one aspect, a ratio of the dissipation distance 128 to the opening diameter 130 may be greater than ten. In another aspect, the ratio of the dissipation distance 128 to opening diameter 130 may be greater than fifteen. In yet another aspect, the ratio of the dissipation distance 128 to the opening diameter 130 may be greater than twenty. In another aspect of the present disclosure, the exhaust device 56 may be arranged such that airflow 132 approaching exhaust screen 86 may be substantially uniform across the diameter 96 of the housing 84.

Figure 4:
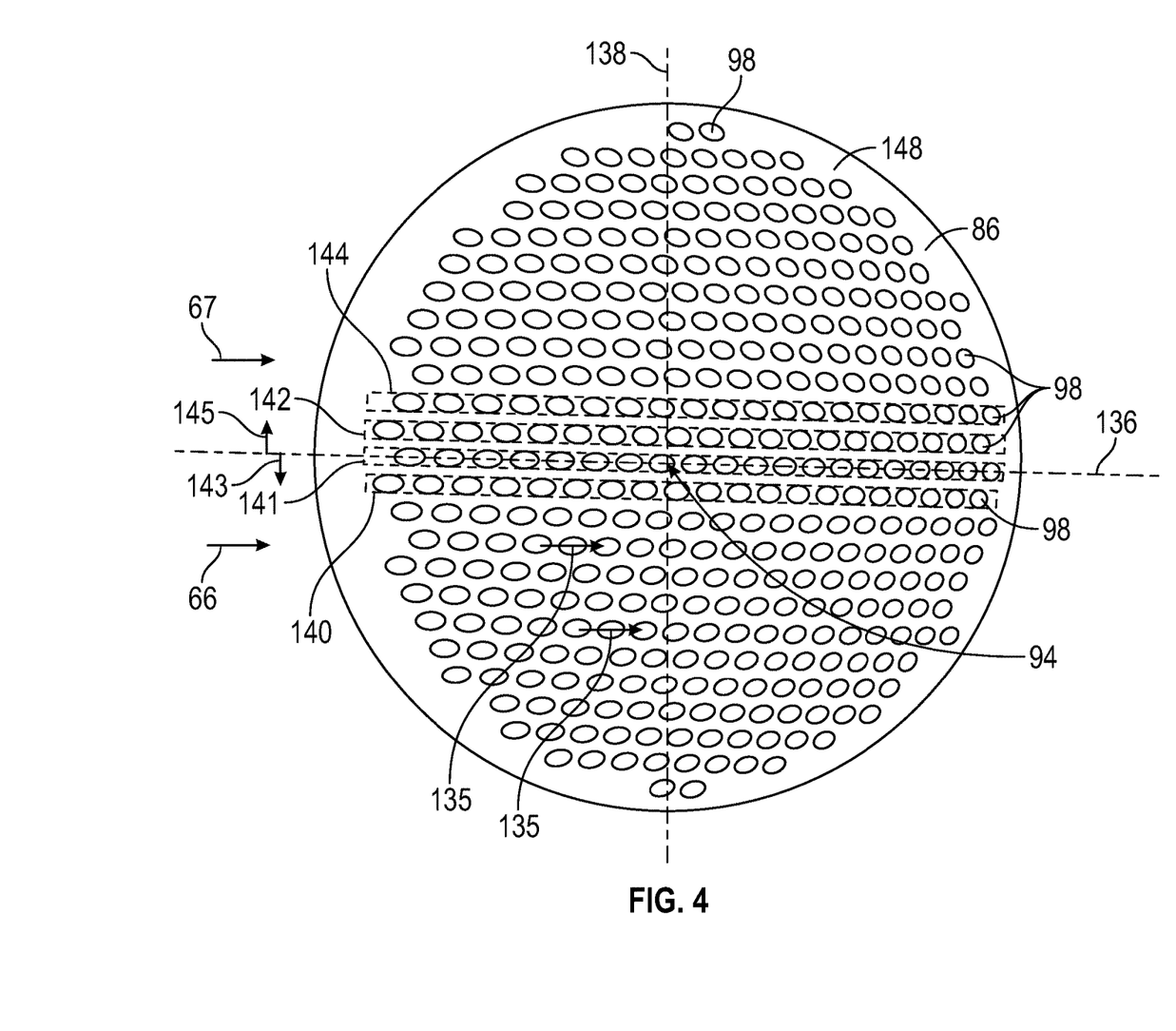
FIG. 4 depicts a plan view taken at view 4-4 of FIG. 3 of an outer side of an exit screen, according to an aspect of the present disclosure.

FIG. 4 depicts a plan view, taken at view 4-4 of FIG. 3, of an outer side of exhaust screen 86, according to an aspect of the present disclosure. As shown in FIG. 4, the exhaust screen 86 defines a longitudinal centerline axis 136 extending parallel to the flow direction 67 of the bypass airflow 66, and a lateral axis 138 extending orthogonal to the longitudinal centerline axis 136. The plurality of exit openings 98 in the exhaust screen 86 may be arranged in a plurality of rows of exit openings 98. For example, as shown in FIG. 4, the plurality of exit openings 98 may be arranged in a first row 140 that may extend parallel to the longitudinal centerline axis 136 on a first side 143 of the longitudinal centerline axis 136. A central row 141 may extend along the longitudinal centerline axis 136. A second row 142 may be arranged laterally adjacent to the central row 141 on a second side 145 of the longitudinal centerline axis and may also extend parallel to the longitudinal centerline axis 136. A third row 144 may be arranged laterally adjacent to the second row 142 and may also extend parallel to the longitudinal centerline axis 136. As was described above, each of the exit openings 98 is arranged at an exit angle 134 (FIG. 3) so as to provide the directional (exit) airflow 135 in the downstream direction (i.e., in the same direction as the flow direction 67). For reference, the cross-sectional view of the exhaust screen 86 depicted in FIG. 3 may be taken along the longitudinal centerline axis 136 shown in FIG. 4, which depicts the exit angle 134 of the exit openings 98.

Figure 5:
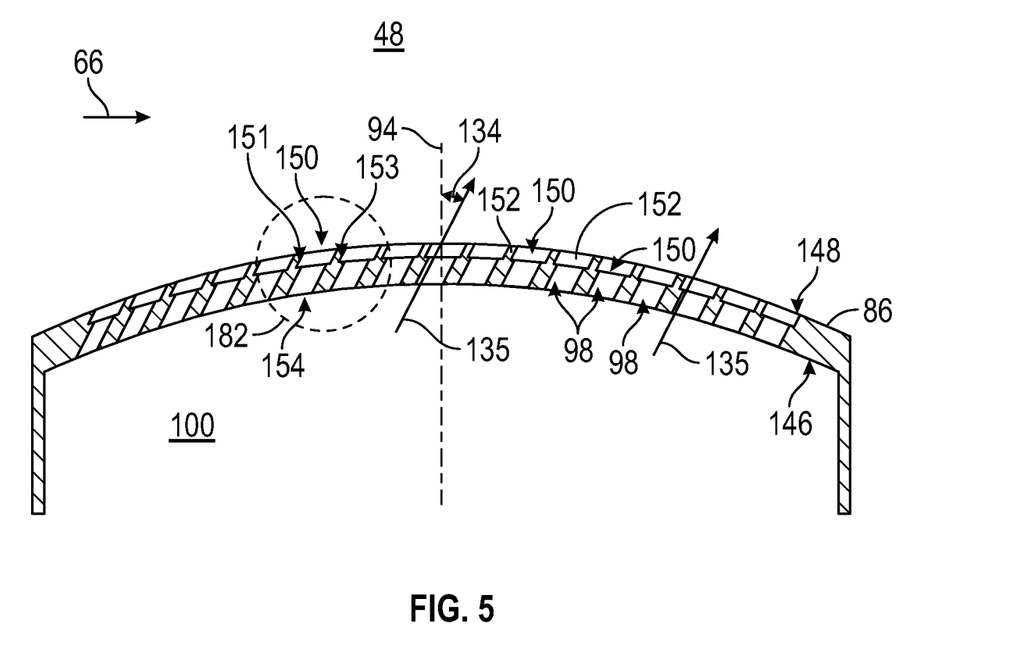
FIG. 5 is a partial cross-sectional view of an alternate arrangement of an exit screen to that depicted in FIG. 3, according to another aspect of the present disclosure.
Figure 6:
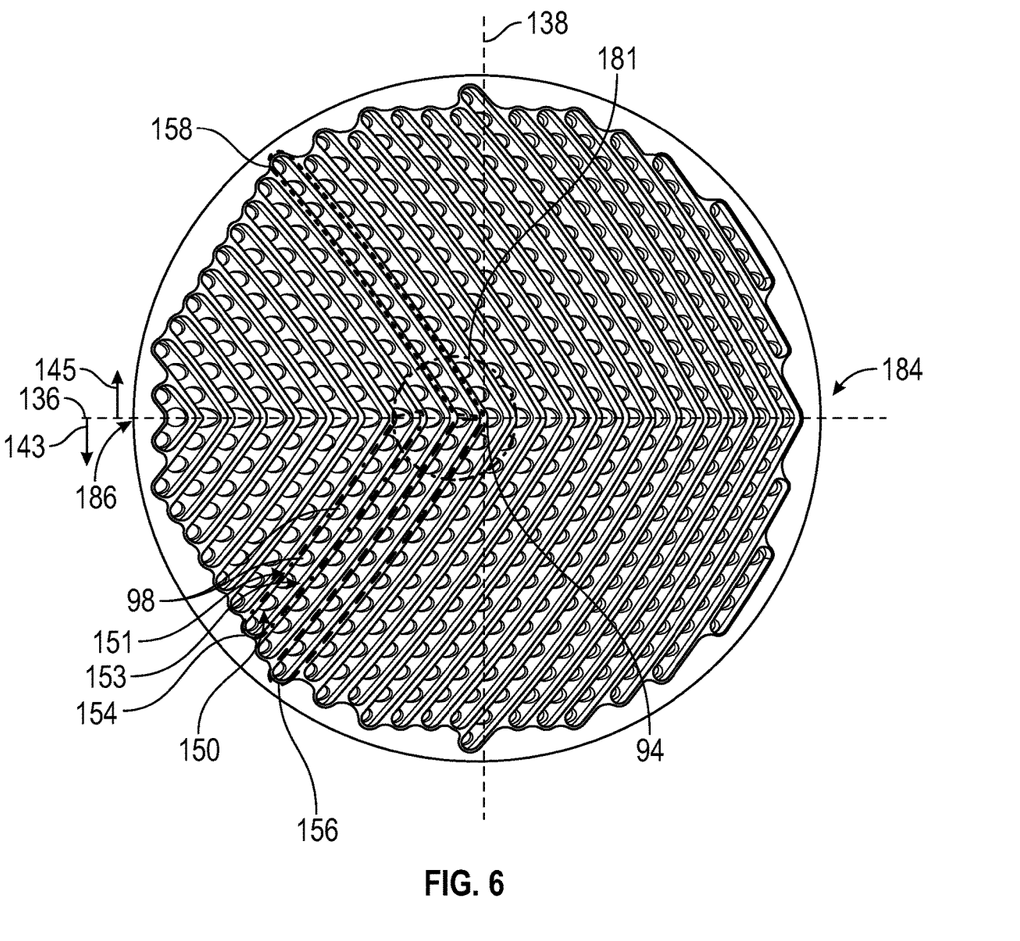
FIG. 6 is a plan view of the outer side of the alternate exit screen of FIG. 5, according to another aspect of the present disclosure.
Figure 7:
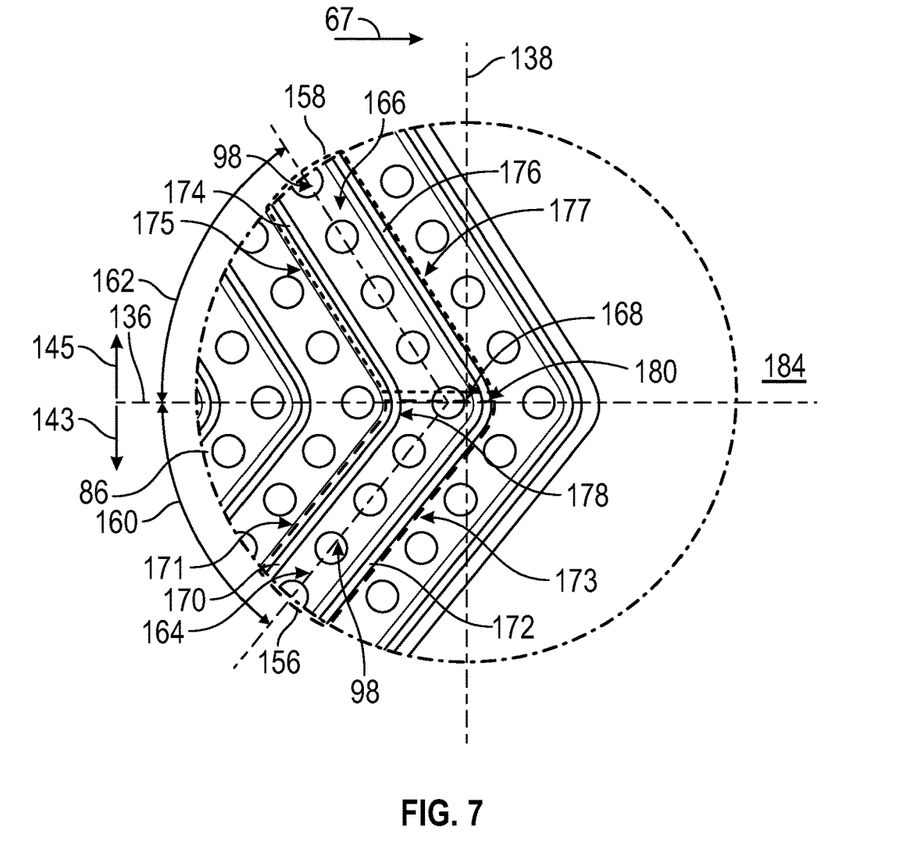
FIG. 7 is an enlarged view taken at detail view 181 of FIG. 6, according to an aspect of the present disclosure.
Figure 8:
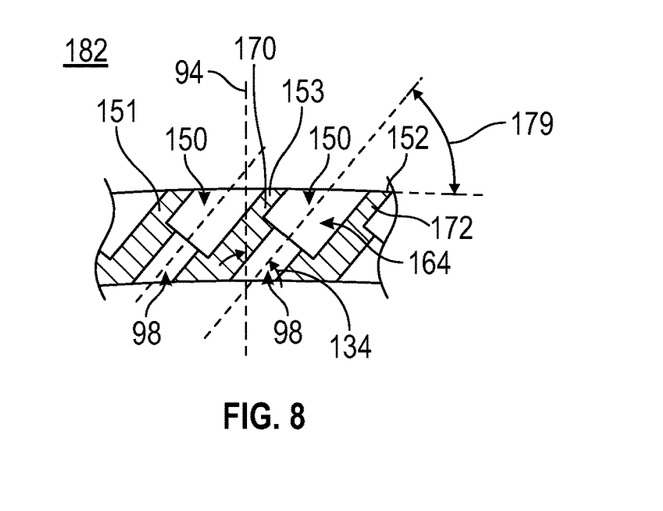
FIG. 8 is an enlarged view of exit openings in an exhaust screen, taken at detail 182 of FIG. 5, according to an aspect of the present disclosure.

FIG. 5 is a partial cross-sectional view of an alternate arrangement of an exhaust screen of that depicted in FIG. 3, according to another aspect of the present disclosure. FIG. 6 is a plan view of the outer side of the alternate exit screen of FIG. 5. FIG. 7 is an enlarged view taken at detail view 181 of FIG. 6. FIG. 8 is an enlarged view taken at detail 182 of FIG. 5. In the FIG. 3 aspect, the exit openings 98 are depicted as being generally circular holes extending through the exhaust screen 86 from the inner surface 146 of the exhaust screen 86 to the outer surface 148 of the exhaust screen 86. Referring collectively to FIGS. 5 to 8, in the alternate aspect of the exhaust screen 86, the exhaust screen 86 includes recesses 150 in the outer surface 148 of the exhaust screen 86. As shown in FIG. 5, a plurality of the exit openings 98 may be arranged in a row 154 that includes a recess 150 extending across the row 154. The recess 150 of the row 154 may define an upstream vane 151 for the row 154, and a downstream vane 153 for the row 154. Thus, a plurality of vanes 152 are defined in the exhaust screen 86 between respective recesses 150 that extend across respective rows of the plurality of exit openings 98.

Referring to FIGS. 6 and 7, the plurality of rows of exit openings 98 may be arranged to include a first row 156 that is arranged on the first side 143 of the longitudinal centerline axis 136 at a first angle 160 with respect to the longitudinal centerline axis 136 and the lateral axis 138, and second row 158 of the exit openings 98 may be arranged on the second side 145 of the longitudinal centerline axis 136 at a second angle 162 with respect to the longitudinal centerline axis 136 and the lateral axis 138. The first row 156 includes a first recess 164 that extends across the first row 156 in the outer surface 148 of the exhaust screen 86, and the second row 158 includes a second recess 166 that extends across the second row 158 in the outer surface 148 of the exhaust screen 86. The first recess 164 and the second recess 166 extend to the longitudinal centerline axis 136 to define a V-shape apex 168 therebetween at the longitudinal centerline axis 136. The first recess 164 defines a first upstream vane 170 on an upstream side 171 of the first row 156 and a first downstream vane 172 on a downstream side 173 of the first row 156. The second recess 166 defines a second upstream vane 174 on an upstream side 175 of the second row 158 and a second downstream vane 176 on a downstream side 177 of the second row 158. The first upstream vane 170 and the second upstream vane 174 merge at the longitudinal centerline axis 136 to define an upstream vane apex 178, and the first downstream vane 172 and the second downstream vane 176 merge at the longitudinal centerline axis 136 to define a downstream vane apex 180. In FIG. 7, the upstream vane apex 178 and the downstream vane apex 180 are depicted as being directed toward a downstream side 184 of the exhaust screen 86. That is, the first row 156 and the second row 158 define a V-shaped row in which the apex is directed downstream with respect to the flow direction 67. However, each of the rows depicted in FIGS. 6 and 7 may be reversed such that, for example, the first row 156 and the second row 158 may be arranged so as to define a V-shaped row in which the apex is directed toward an upstream side 186 of the exhaust screen 86.

As shown in FIG. 8, each of the first upstream vane 151 and the first downstream vane 153 of the row 154 is arranged at a same acute angle 179 as the exit angle 134 of the exit openings 98. The first upstream vane 170 and the first downstream vane 172 of the first row 156 (FIG. 7), and the second upstream vane 174 and the second downstream vane 176 of the second row 158 (FIG. 7), may also be arranged at the same acute angle 179 as the exit angle 134 of the exit openings 98.

The foregoing arrangements provide an exhaust device as part of a compressor bleed air system that provide directional flow of the compressed air into the bypass flow passage between the core engine and the nacelle so as to reduce or to eliminate scrubbing of high temperature exhaust air against the inner surface of the nacelle. As a result, the need to provide a heat shield on the nacelle can be eliminated, thereby improving the durability of the nacelle, as well as reducing the weight of the nacelle.

Further aspects of the present disclosure are provided by the subject matter of the following clauses.

An exhaust device for a compressor bypass bleed system of a ducted fan engine, the exhaust device including a housing having an inlet end and an outlet end, and defining a centerline axis from the inlet end to the outlet end, an inner flow conditioner arranged at the inlet end, the inner flow conditioner including a plurality of openings for conducting a flow of compressed air therethrough into the housing, and an exit screen arranged at the outlet end of the housing, the exit screen including a plurality of exit openings therethrough arranged at an acute angle with respect to the centerline axis for providing a directional flow of compressed air from the housing therethrough.

The exhaust device according to the preceding clause, wherein the acute angle is arranged to provide a flow of compressed air therethrough at least partially in a flow direction of a bypass airflow through a bypass flow passage of the ducted fan engine.

The exhaust device according to any preceding clause, wherein the acute angle has a range from thirty-five degrees to forty-five degrees.

The exhaust device according to any preceding clause, wherein the exit screen defines, in a plan view of an outer surface of the exit screen, a longitudinal centerline axis extending in a same direction as a bypass flow direction, and a lateral axis extending orthogonal to the longitudinal centerline axis, the plurality of exit openings being arranged in a plurality of rows of exit openings, including a first row of exit openings arranged on a first side of the longitudinal centerline axis, and a second row of exit openings arranged on a second side of the longitudinal centerline axis opposite the first side.

The exhaust device according to any preceding clause, wherein the first row of exit openings extends at a first angle with respect to the longitudinal centerline axis and the lateral axis, and the second row of exit openings extends at a second angle with respect to the longitudinal centerline axis and the lateral axis.

The exhaust device according to any preceding clause, wherein the first row of exit openings includes a first recess extending across the first row of exit openings in an outer surface of the exit screen, and the second row of exit openings includes a second recess extending across the second row of exit openings in the outer surface of the exit screen.

The exhaust device according to any preceding clause, wherein the first recess and the second recess extend to the longitudinal centerline axis to define a V-shape apex therebetween at the longitudinal centerline axis.

The exhaust device according to any preceding clause, wherein the first recess defines a first upstream vane on an upstream side of the first row of exit openings and a first downstream vane on a downstream side of the first row of exit openings, and the second recess defines a second upstream vane on an upstream side of the second row of exit openings and a second downstream vane on a downstream side of the second row of exit openings, the first upstream vane and the second upstream vane merging at the longitudinal centerline axis to define an upstream vane apex and the first downstream vane and the second downstream vane merging at the longitudinal centerline axis to define a downstream vane apex.

The exhaust device according to any preceding clause, wherein each of the first upstream vane, the first downstream vane, the second upstream vane, and the second downstream vane is arranged at a same acute angle as the acute angle of the exit openings.

The exhaust device according to any preceding clause, wherein, in the plan view, the upstream vane apex and the downstream vane apex are directed toward a downstream side of the exit screen.

A ducted fan engine including a core engine including a compressor section and including an outer casing at least partially surrounding the core engine, a nacelle at least partially surrounding the core engine and defining a bypass flow passage between an inner side of the nacelle and the outer casing of the core engine, and a compressor bypass bleed system including (a) an exhaust device having (i) a housing having an inlet end and an outlet end and defining a centerline axis from the inlet end to the outlet end, (ii) an inner flow conditioner arranged at the inlet end, the inner flow conditioner including a plurality of openings for conducting a flow of compressed air therethrough into the housing, and (iii) an exit screen arranged at the outlet end of the housing, the exit screen including a plurality of exit openings therethrough arranged at an acute angle with respect to the centerline axis so as to provide a directional flow of compressed air from the housing therethrough, and (b) a compressor bleed duct system coupling the compressor section to the inlet end of the housing, wherein the exhaust device is coupled to the outer casing of the core engine, and the exit screen is arranged in an opening through the outer casing to provide a flow of compressed air therethrough into the bypass flow passage.

The ducted fan engine according to the preceding clause, wherein the acute angle is arranged to provide a flow of compressed air therethrough at least partially in a flow direction of a bypass airflow through the bypass flow passage.

The ducted fan engine according to any preceding clause, wherein the acute angle has a range from thirty-five degrees to forty-five degrees.

The ducted fan engine according to any preceding clause, wherein the exit screen defines, in a plan view of an outer surface of the exit screen, a longitudinal centerline axis extending in a same direction as a bypass flow direction, and a lateral axis extending orthogonal to the longitudinal centerline axis, the plurality of exit openings being arranged in a plurality of rows of exit openings, including a first row of exit openings arranged on a first side of the longitudinal centerline axis, and a second row of exit openings arranged on a second side of the longitudinal centerline axis opposite the first side.

The ducted fan engine according to any preceding clause, wherein the first row of exit openings extends at a first angle with respect to the centerline axis and the lateral axis, and the second row of exit openings extends at a second angle with respect to the longitudinal centerline axis and the centerline axis.

The ducted fan engine according to any preceding clause, wherein the first row of exit openings includes a first recess extending across the first row of exit openings in an outer surface of the exit screen, and the second row of exit openings includes a second recess extending across the second row of exit openings in the outer surface of the exit screen.

The ducted fan engine according to any preceding clause, wherein the first recess and the second recess extend to the longitudinal centerline axis to define a V-shape apex therebetween at the longitudinal centerline axis.

The ducted fan engine according to any preceding clause, wherein the first recess defines a first upstream vane on an upstream side of the first row of exit openings and a first downstream vane on a downstream side of the first row of exit openings, and the second recess defines a second upstream vane on an upstream side of the second row of exit openings and a second downstream vane on a downstream side of the second row of exit openings, the first upstream vane and the second upstream vane merging at the longitudinal centerline axis to define an upstream vane apex and the first downstream vane and the second downstream vane merging at the longitudinal centerline axis to define a downstream vane apex.

The ducted fan engine according to any preceding clause, wherein each of the first upstream vane, the first downstream vane, the second upstream vane, and the second downstream vane is arranged at a same acute angle as the acute angle of the exit openings.

The ducted fan engine according to any preceding clause, wherein, in the plan view, the upstream vane apex and the downstream vane apex are directed toward a downstream side of the exit screen.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. An exhaust device for a compressor bypass bleed system of a ducted fan engine, the exhaust device comprising: a housing having an inlet end and an outlet end, and defining a centerline axis from the inlet end to the outlet end; an inner flow conditioner arranged at the inlet end, the inner flow conditioner including a plurality of openings for conducting a flow of compressed air therethrough into the housing; and an exit screen arranged at the outlet end of the housing, the exit screen including a plurality of exit openings therethrough arranged at an acute angle with respect to the centerline axis for providing a directional flow of compressed air from the housing therethrough, wherein the exit screen defines, in a plan view of an outer surface of the exit screen, a longitudinal centerline axis extending in a same direction as a flow direction of a bypass airflow, and a lateral axis extending orthogonal to the longitudinal centerline axis, the plurality of exit openings being arranged in a plurality of rows of exit openings, including a first row of exit openings arranged on a first side of the longitudinal centerline axis, and a second row of exit openings arranged on a second side of the longitudinal centerline axis opposite the first side, the first row of exit openings extending at a first non-zero angle with respect to the longitudinal centerline axis and the lateral axis, and the second row of exit openings extending at a second non-zero angle with respect to the longitudinal centerline axis and the lateral axis.

2. The exhaust device according to claim 1, wherein the plurality of exit openings are arranged at the acute angle to provide the flow of compressed air therethrough at least partially in the flow direction of the bypass airflow.

3. The exhaust device according to claim 2, wherein the acute angle has a range from thirty-five degrees to forty-five degrees.

4. The exhaust device according to claim 1, wherein the first row of exit openings includes a first recess extending across the first row of exit openings in the outer surface of the exit screen, and the second row of exit openings includes a second recess extending across the second row of exit openings in the outer surface of the exit screen.

5. The exhaust device according to claim 4, wherein the first recess and the second recess extend to the longitudinal centerline axis to define a V-shape apex therebetween at the longitudinal centerline axis.

6. The exhaust device according to claim 5, wherein the first recess defines a first upstream vane on an upstream side of the first row of exit openings and a first downstream vane on a downstream side of the first row of exit openings, and the second recess defines a second upstream vane on an upstream side of the second row of exit openings and a second downstream vane on a downstream side of the second row of exit openings, the first upstream vane and the second upstream vane merging at the longitudinal centerline axis to define an upstream vane apex, and the first downstream vane and the second downstream vane merging at the longitudinal centerline axis to define a downstream vane apex.

7. The exhaust device according to claim 6, wherein each of the first upstream vane, the first downstream vane, the second upstream vane, and the second downstream vane is arranged at a same acute angle as the acute angle of the exit openings.

8. The exhaust device according to claim 6, wherein, in the plan view, the upstream vane apex and the downstream vane apex are directed toward a downstream side of the exit screen.

9. A ducted fan engine comprising:
a core engine including a compressor section and including an outer casing at least partially surrounding the core engine;
a nacelle at least partially surrounding the core engine and defining a bypass airflow passage between an inner side of the nacelle and the outer casing of the core engine; and
a compressor bypass bleed system including (a) an exhaust device having (i) a housing having an inlet end and an outlet end, and defining a centerline axis from the inlet end to the outlet end, (ii) an inner flow conditioner arranged at the inlet end, the inner flow conditioner including a plurality of openings for conducting a flow of compressed air therethrough into the housing, and (iii) an exit screen arranged at the outlet end of the housing, the exit screen including a plurality of exit openings therethrough arranged at an acute angle with respect to the centerline axis so as to provide a directional flow of compressed air from the housing therethrough, and (b) a compressor bleed duct system coupling the compressor section to the inlet end of the housing,
wherein the exhaust device is coupled to the outer casing of the core engine, and the exit screen is arranged in an opening through the outer casing to provide the flow of compressed air therethrough into the bypass airflow passage, and
wherein the exit screen defines, in a plan view of an outer surface of the exit screen, a longitudinal centerline axis extending in a same direction as a flow direction of a bypass airflow, and a lateral axis extending orthogonal to the longitudinal centerline axis, the plurality of exit openings being arranged in a plurality of rows of exit openings, including a first row of exit openings arranged on a first side of the longitudinal centerline axis, and a second row of exit openings arranged on a second side of the longitudinal centerline axis opposite the first side, the first row of exit openings extending at a first non-zero angle with respect to the longitudinal centerline axis and the lateral axis, and the second row of exit openings extending at a second non-zero angle with respect to the longitudinal centerline axis and the lateral axis.

10. The ducted fan engine according to claim 9, wherein the plurality of exit openings are arranged at the acute angle to provide the flow of compressed air therethrough at least partially in the flow direction of the bypass airflow through the bypass airflow passage.

11. The ducted fan engine according to claim 10, wherein the acute angle has a range from thirty-five degrees to forty-five degrees.

12. The ducted fan engine according to claim 9, wherein the first row of exit openings includes a first recess extending across the first row of exit openings in the outer surface of the exit screen, and the second row of exit openings includes a second recess extending across the second row of exit openings in the outer surface of the exit screen.

13. The ducted fan engine according to claim 12, wherein the first recess and the second recess extend to the longitudinal centerline axis to define a V-shape apex therebetween at the longitudinal centerline axis.

14. The ducted fan engine according to claim 13, wherein the first recess defines a first upstream vane on an upstream side of the first row of exit openings and a first downstream vane on a downstream side of the first row of exit openings, and the second recess defines a second upstream vane on an upstream side of the second row of exit openings and a second downstream vane on a downstream side of the second row of exit openings, the first upstream vane and the second upstream vane merging at the longitudinal centerline axis to define an upstream vane apex, and the first downstream vane and the second downstream vane merging at the longitudinal centerline axis to define a downstream vane apex.

15. The ducted fan engine according to claim 14, wherein each of the first upstream vane, the first downstream vane, the second upstream vane, and the second downstream vane is arranged at a same acute angle as the acute angle of the exit openings.

16. The ducted fan engine according to claim 14, wherein, in the plan view, the upstream vane apex and the downstream vane apex are directed toward a downstream side of the exit screen.

* * * * *